United States Patent [19]

Ray

[11] Patent Number: 4,755,751
[45] Date of Patent: Jul. 5, 1988

[54] BRUSHLESS ROTARY POSITION TRANSDUCER

[75] Inventor: Glen Ray, Big Bend, Wis.

[73] Assignee: Allen-Bradley Company, Inc., Milwaukee, Wis.

[21] Appl. No.: 946,838

[22] Filed: Dec. 29, 1986

[51] Int. Cl.⁴ ............................ G01B 7/30; G01P 3/44
[52] U.S. Cl. .................................... 324/208; 318/661; 324/163; 340/347 SY; 340/870.32
[58] Field of Search ................................ 324/163–165, 324/173, 174, 208, 160; 340/870.32, 870.33, 870.34; 318/654, 655, 660, 661; 310/168

[56] References Cited

U.S. PATENT DOCUMENTS

| 2,949,576 | 8/1960 | Bolton | 340/870.31 |
| 3,819,268 | 6/1974 | Johnson | 356/28 |
| 4,011,440 | 3/1977 | Steglich | 235/183 |
| 4,449,117 | 5/1984 | Fortescue | 340/347 SY |
| 4,481,468 | 11/1984 | Ono et al. | 324/163 |
| 4,605,889 | 8/1986 | Luneau | 324/163 X |
| 4,692,699 | 9/1987 | Brunet et al. | 324/207 |

OTHER PUBLICATIONS

"Feedback Devices for Brushless DC Motors", Article by J. R. Luneau, Luneau Associates, Sep. 11, 1984, 20 pp.
"Technical Guide ABSOCODER MRE", by NSD Corporation, pp. 1-43, Received in Pat. Office 12/29/86.

Primary Examiner—Gerard R. Strecker
Attorney, Agent, or Firm—Quarles & Brady

[57] ABSTRACT

A brushless resolver has first and second ring-shaped magnetic pole elements spaced from each other along a common axis. An excitation coil is wound axially between the two pole elements. First and second output coils are wound through the first and second pole elements and spaced radially from each other. A rotor is within the pole elements and has a shaft extending along the axis. First and second magnetic coupling elements are spaced along the shaft each of which being coplanar with a different one of the pole elements. Each coupling element providing 180 degrees of magnetic coupling with respect to the corresponding pole element. A high frequency signal applied to the excitations coil is transformer coupled to the output signals. The degree of coupling varies with the position of the coupling elements. The demodulated signal from each of the output coils has a triangular shaped waveform which may be directly differentiated to produce the angular velocity of the rotor shaft.

15 Claims, 3 Drawing Sheets

BRUSHLESS ROTARY POSITION TRANSDUCER

The present invention relates to devices which produce an electrical signal indicating the angular position of a shaft, and more particularly to a type of those devices known as resolvers.

BACKGROUND OF THE INVENTION

In order to determine the angular position of a rotating shaft, a resolver was typically connected to the shaft. A conventional transmitter resolver has a primary coil wound on its rotor to which a high frequency (e.g. 4 KHz) excitation signal is applied. These prior art resolvers require brushes or a rotating transformer to transfer electrical current to the rotating excitation coil. Two secondary coils are spaced at 90 degrees with respect to each other around the resolver's stator. As the rotor spins, a signal is induced from the excitation coil into each of the secondary stator coils producing a high frequency signal on each of the secondary coils. The movement of the rotor modulates the induced signal so that it has a sinusoidal envelope.

By demodulating the signals from the stator coils, two sinusoidal waveforms are produced which have phase angles that correspond to the angular position of the rotor. The amplitude of the signal from one coil represents the sine of the shaft angle. Specifically the positive peak in the demodulated output from this coil is produced when the rotor is at the 90 degree position and a negative peak occurs when the shaft is at 270 degrees. Because the other secondary coil is displaced 90 degrees around the stator from the first coil, the amplitude of its demodulated output signal corresponds to the cosine of the rotor angle.

U.S. Pat. No. 4,449,117 issued on May 15, 1984 to Stephen Fortescue shows an electronic circuit for receiving the sine and cosine output signals from a resolver and producing a digital output representing the angular position of the shaft. The system that determines the angular position from the sine and cosine signals also has circuitry for determining the velocity of the shaft.

U.S. Pat. No. 4,481,468 issued on Nov. 6, 1984 to Tadahiro Ono, et al. shows a system for determining shaft velocity using a two-phase resolver. Two square wave excitation signals are applied to the sine and cosine coils to produce an output signal on the rotor coil. A wave shaper produces a square wave having the same period and phase as the output voltage from the rotor coil of the resolver. Triangular waveforms are produced from this square wave which are differentiated to derive the velocity of the shaft.

SUMMARY OF THE INVENTION

A rotary position transducer comprises an excitation coil similar to that found in a conventional resolver. The transducer also includes first and second ring-shaped magnetic pole elements spaced along a common axis. Two output coils are wound through each of the pole elements and spaced radially from each other. Within the pole elements is a rotor having a shaft extending along the common axis. Two magnetic coupling elements are spaced along the shaft so that each is aligned with one of the pole elements. Each of the coupling elements provides 180 degrees of low reluctance magnetic coupling with respect to the corresponding pole element.

The novel resolver is operated by applying a high frequency signal applied to the excitation coil which is transformer coupled to the two output coils. The degree of coupling is a function of the angular position of the shaft and its coupling elements.

An object of the present invention is to provide a rotary position transducer which produces a triangular shaped waveform which may be differentiated directly to produce a representation of the shaft velocity. This eliminates the need for additional circuitry to convert a conventional sinusoidal resolver output signal into a triangular waveform for differentiation. In addition, the present invention eliminates the rotor coils and thereby the need for transferring electrical current to the rotor.

DETAILED DESCRIPTION OF THE PRESENT INVENTION

Figure 1:
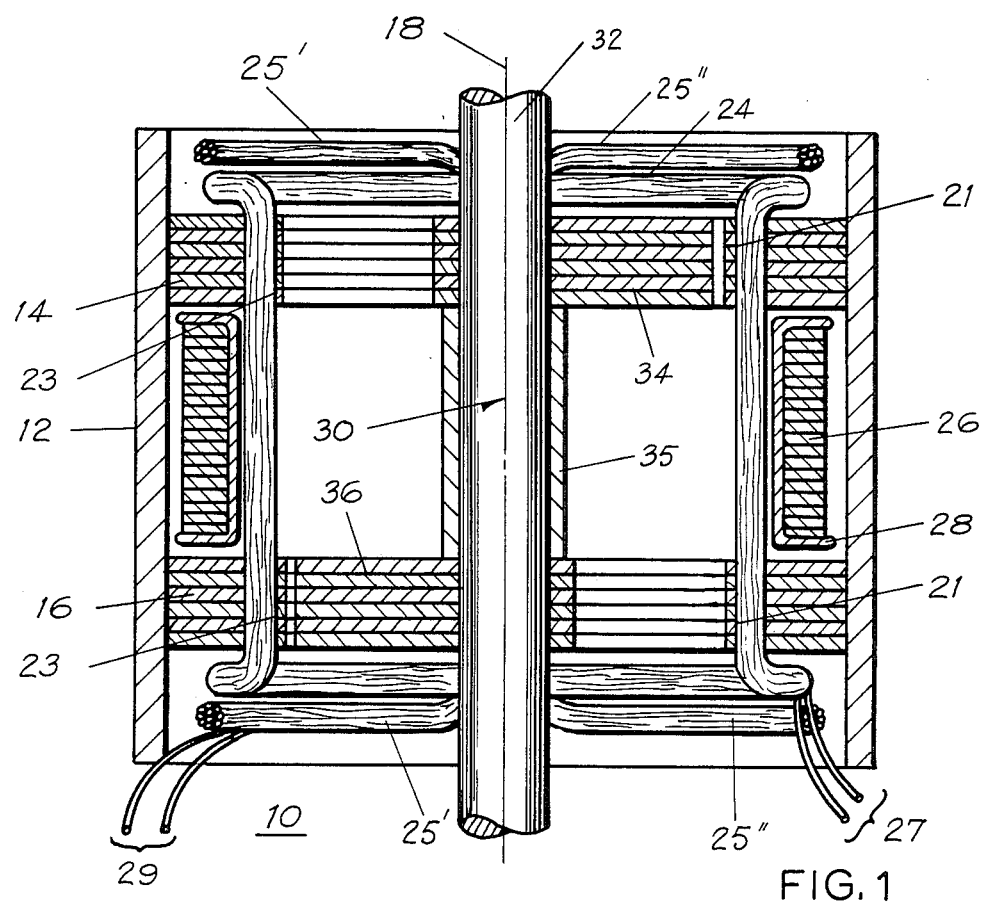
FIG. 1 is a radial cross-section view through a two pole resolver according to the present invention.
Figure 2:
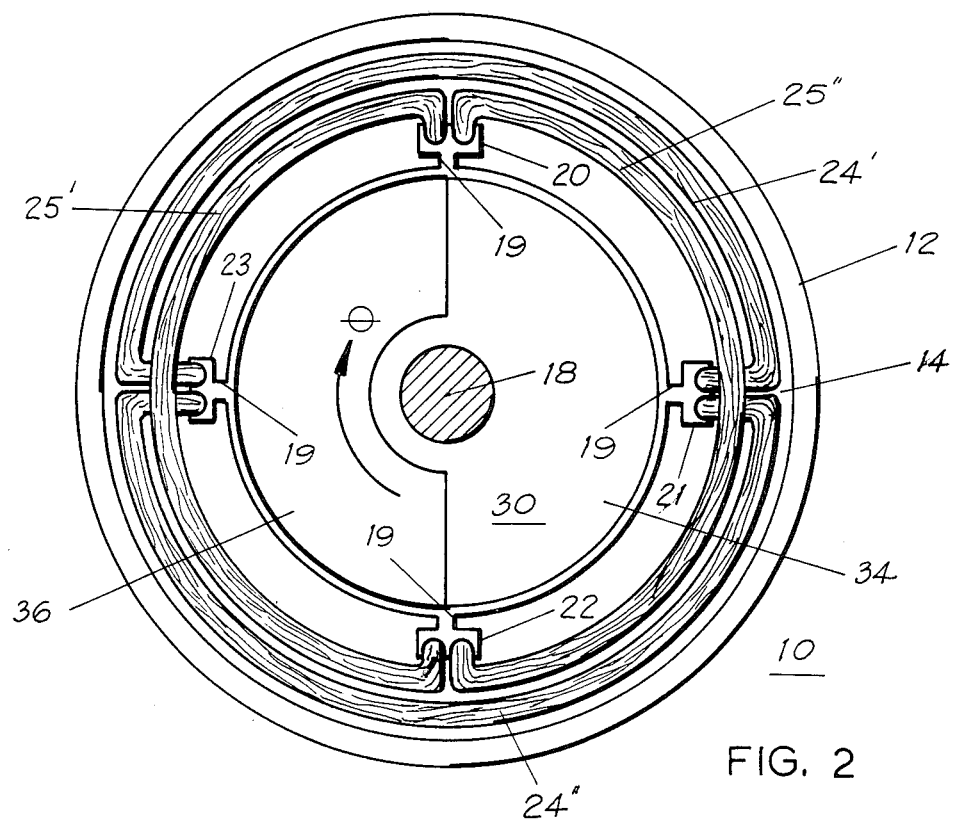
FIG. 2 is a axial view of one end of the resolver in FIG. 1.

A resolver 10 is shown in FIGS. 1 and 2 as having a hollow cylindrical outer housing 12 formed of a magnetically conductive material. Within the outer housing are two magnetic pole stator elements 14 and 16 also made of a magnetically conductive material, such as iron. Each of the pole elements is conventionally formed by a lamination of a number of ring-shaped sheets. The two magnetic pole elements are spaced from one another along the resolver's axis 18. Each of the pole elements has four coil slots 20–23 extending axially along their inner circumferential surface and substantially aligned with a similar aperture in the other pole piece. Each of the slots includes a gap 19 in the inner circumferential surface of the pole elements. Preferably, one of the pole pieces 14 or 16 is rotated slightly about axis 18 with respect to the other pole piece so that their slot gaps 19 do not line up.

A first output coil 24 is wound through opposite coil apertures 21 and 23 in each of the pole elements 14 and 16. The first coil 24 is formed by two windings 24' and 24" which are connected in series so that their voltages add cumulatively. The windings run through aperture 21 in the second pole element 16 parallel with axis 18 and through aperture 21 in the first pole piece 14. The first coil then runs circumferentially around the first pole element 14 as shown in FIG. 2, with one of the windings 24' and 24" on either side of the axis 18. Then the first coil 24 goes through the apertures 23 in the first and second pole elements 14 and 16 on the other side of the axis 18. The first coil emerges from the second pole piece 16 and runs circumferentially around it back to the starting point at aperture 21 on the other side. The second output coil 25 has two windings 25' and 25" and is similarly wound through the other set of coil apertures 20 and 22. Both coils 24 and 25 have leads 27 and 29 respectively for connection to a processing circuit. The two sets of coil apertures and hence the two output coils 24 and 25 are spaced 90 degrees radially around the axis 18 from one another. A donut-shaped excitation coil 26 is wound around axis 18 between the first and second pole elements 14 and 16. The excitation coil may be wound around a bobbin 28.

Within the inner openings of the two pole elements 14 and 16 and the excitation coil 26 is a rotor 30 consisting of a shaft 32 and two magnetic coupling elements 34 and 36. The shaft 32 extends along the axis 18 and has the two magnetic coupling elements 34 and 36 separated axially by spacer 35. The first magnetic coupling element 34 is aligned so as to be substantially coplanar with the first pole element 14 and the second magnetic coupling element 36 is substantially coplanar with the second pole element 16. The shaft 32 and both magnetic coupling elements 34 and 36 are made of a magnetically conductive material, such as iron. Each of the magnetic coupling elements 34 and 36 has a substantially semi-circular shape to provide 180 degrees of low reluctance coupling to its pole element. The elements 34 and 36 are positioned 180 degrees around the shaft with respect to each other. For example as positioned in FIG. 2, the first coupling element 34 has the center of its semi-circle adjacent aperture 21 and the center of the second element is adjacent aperture 23. Each of the magnetic coupling elements 34 and 36 consist of a number of laminations of a magnetically conductive material.

During the operation of the resolver 10, its rotor shaft 32 is mechanically connected to the device whose rotational position is to be determined. A 4 KHz sinusoidal signal is applied to the excitation coil 26. The high frequency excitation signal causes the first and second magnetic pole elements 14 and 16 to alternately become the north and south magnetic poles of the resolver. As the shaft 32 rotates about axis 18, the elements 34 and 36 provide 180 degrees of low reluctance magnetic coupling between various portions of the first and second pole elements. For example, when the shaft is positioned as shown in FIG. 2, the first coupling element 34 provides a low reluctance path to the right side of pole element 14 and a high reluctance path to its left side. The second element 36 provides a low reluctance path to the left side of pole element 16 in this position. This changing magnetic coupling induces an electric signal into each of the output coils 24 and 25 by transformer action. As the coupling elements 14 and 16 rotate, the changing position of the magnetic coupling of the transformer varies the induced EMF in the output coils 24 and 25.

Figure 3A:
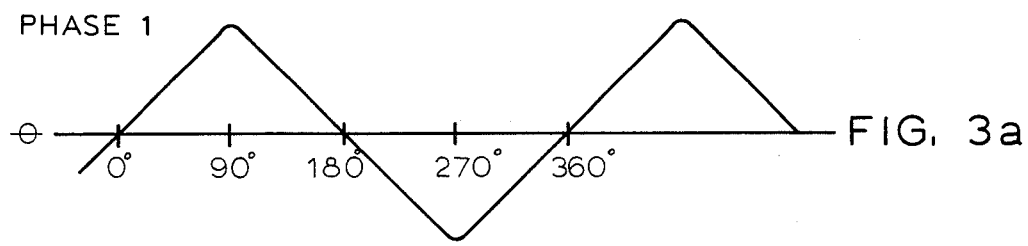
FIGS. 3a and 3b are diagrams of the demodulated waveforms from the output coils of the resolver in FIG. 1.
Figure 3B:
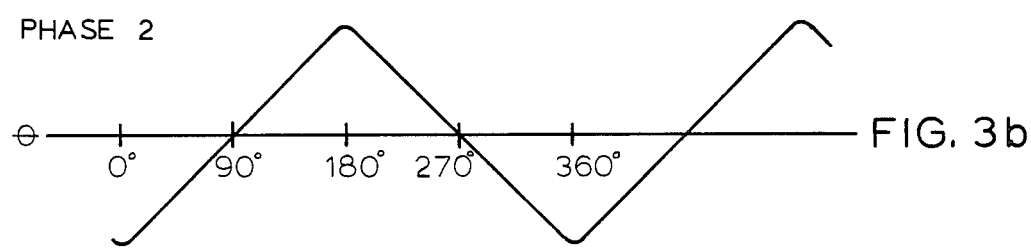

As with conventional resolvers, the output waveform from each of the coils 24 and 25 will be a high frequency signal having an amplitude envelope which varies with the rotation of the shaft 32. Conventional techniques are employed to demodulate the high frequency signal to recover the waveform of the envelope. However, whereas conventional resolvers will have a generally sinusoidal demodulated signal, the present resolver will produce triangular waveforms as shown in FIGS. 3a and 3b. The phase of the waveform in FIG. 3(a) from one of the coils corresponds to a pseudo sine function of rotor angle θ in that the signal crosses the zero axis at 0 and 180 degrees and has positive and negative peaks at 90 and 270 degrees, respectively. The zero phase angle of this signal defines the zero degree position of the resolver shaft. However, because the waveform is triangular the amplitude between these points does not precisely track the sine values. The signal for the other output coil shown in FIG. 3(b), similarly has a phase which corresponds to a pseudo cosine waveform.

The linear portions of the output signals in FIGS. 3(a) and (b) have a slight ripple due to a ripple in the magnetic field as the radial edges of the coupling elements 34 and 36 pass by the gaps 19 in the pole element apertures 20–23. This ripple may be reduced by rotating one of the pole elements 14 or 16 slightly with respect to the other element so that their slot gaps 19 are not aligned. Thus when the radial edges of one coupling element are adjacent to slots 19, the radial edges of the other coupling element are not adjacent to the slots in its pole piece.

Each of the triangular phase 1 and 2 waveforms for the pseudo sine and cosine functions shown in FIGS. 3(a) and (b) may be differentiated directly to produce the angular velocity of the rotor shaft and hence the angular velocity of the apparatus connected to the resolver. Specifically the derivative of the waveform's slope represents the velocity. One example of a circuit for deriving the velocity is shown as element 20 of the aforementioned U.S. Pat. No. 4,481,468.

A circuit similar to that shown in the aforementioned U.S. Pat. No. 4,449,117 may be used as a circuit to determine the angular position of the rotor shaft from the demodulated phase 1 and 2 output signals. The circuit in this patent must be modified according to the teachings of Michael Gasperi in his U.S. patent application Ser. No. 619,325 filed on June 11, 1984. The invention of Mr. Gasperi teaches using the two phase output of a specific resolver to program the trigonometric functions stored in the memories of the Fortescue circuit. Thus, even though the outputs from the present resolver are not single frequency sinusoidal trigonometric functions, so as to enable the use of trigonometric identities in the determination of the rotor position, by storing the resolver phase 1 and phase 2 values for various angles in the memories, the angular position of the rotor shaft may be determined from the triangular output signals.

Figure 6:
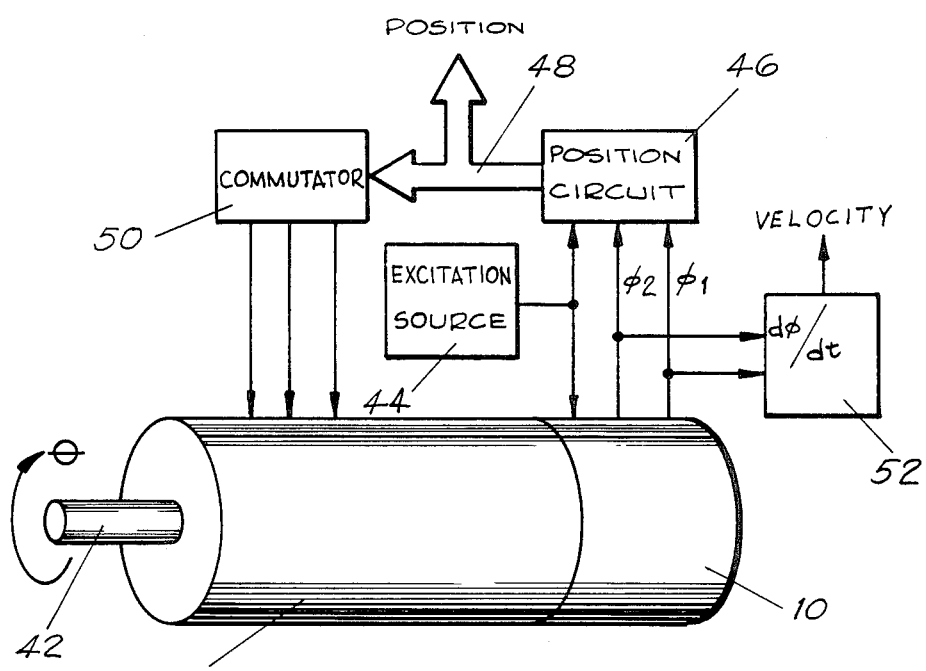
FIG. 6 is a schematic block diagram of the present resolver in a motor control circuit.

With reference to FIG. 6, an alternating current motor 40 has a shaft 42 to which resolver 10 is mounted. A source 44 provides the 4 KHz excitation signal to the resolver 10 and a position determining circuit 46. The position determining circuit 46, such as described immediately above, receives the phase 1 and phase 2 output signals from resolver 10. The output of the position circuit 46 is in the form of a digital number on a parallel output bus 48 and represents the angular position of shaft 42. This angular position is fed to a commutator 50 which may be any of several well known circuits for converting electrical power supplied to it into the three phase signals for driving the motor 40. The angular position of the motor shaft 42 is employed by the commutator so that each of the three phases is properly timed to the rotation of the motor. The two output signals from resolver 10 are also fed to a differentiation circuit 52, which may comprise a circuit similar to that shown in U.S. Pat. No. 4,481,468, for the generation of a velocity signal. The motor control circuit shown in FIG. 6 uses a single resolver to determine the shaft position and its angular velocity as well as to provide a feedback loop from the resolver to the commutator 50 for producing the properly phased drive signals for the motor 40. Previous systems obtained these parameters from multiple sensing devices as opposed to a single resolver.

Figure 4:
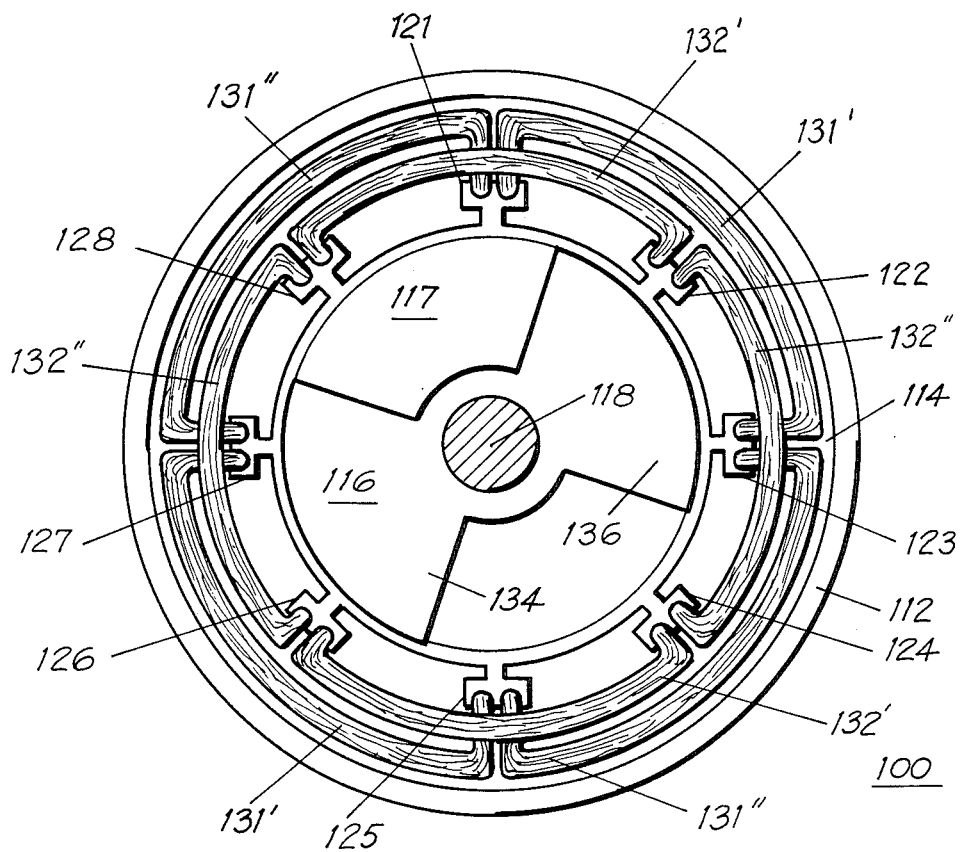
FIG. 4 is an axial view of a four pole resolver according to the present invention.

FIG. 4 shows a four pole resolver 100 according to the present invention. The resolver 100 comprises an outer housing 112 which has two magnetic pole elements (only one pole piece 114 being visible) positioned within it in the same way as the two pole elements 14 and 16 are positioned in the FIG. 1 embodiment. Each pole element in the second embodiment has eight axially extending coil apertures 121–128 on its interior circumferential surface. The apertures are spaced 45 degrees radially around the pole element and the two elements are positioned so that their apertures align.

Two output coils 131 and 132 are wound within various coil apertures. Specifically, the first output coil 131 comprises two separate coil windings 131' and 131" connected so that their voltages add cumulatively. The first winding 131' runs from aperture 121 ninety degrees around the surface of the upper pole element 114 to the third aperture 123. The first winding runs down through both pole pieces, across the bottom surface of the lower pole piece, and up through the fifth set of apertures 125. The first winding 131' then runs circumferentially around the pole piece 114 to the seventh aperture 127, down between both pole pieces, and back to the first aperture 121. The second winding 131" of the first coil runs between the same group of coil apertures 121, 123, 125, and 127; except that it runs across pole element 114 between apertures 123 and 125, and between apertures 127 and 121 and along the other pole element between apertures 121 and 123, and apertures 125 and 127. In a similar manner the second output coil 132 has two cumulatively connected windings 132' and 132" which run among the even numbered apertures 122, 124, 126 and 128. Each of the output coils 131 and 132 have sections spaced every 90 degrees around the axis of the resolver, as opposed every 180 degrees as in the embodiment of FIG. 1.

The rotor for resolver 100 consists of a first magnetic coupling element 116 coplanar with the pole element 114 and a second magnetic coupling element 117 coplanar with the other pole element. Each coupling element has two coupling portions 134 and 136 extending axially from opposite sides of the resolver axis 118. The portions 134 and 136 extend radially for 90 degrees and are diametrically opposed to each other. Each of the two 90 degree portions of the coupling elements provide 180 degrees of magnetic coupling with respect to the associated pole element.

Figure 5A:
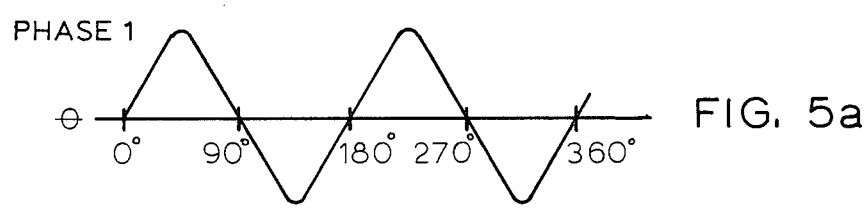
FIGS. 5a and 5b are waveform diagrams of the demodulated signals from the output coils of the resolver in FIG. 4.
Figure 5B:
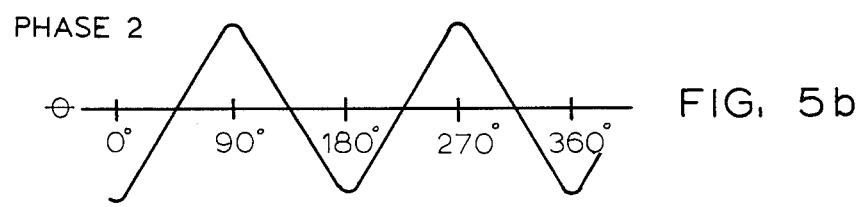

The demodulated waveforms for the two output coils 131 and 132 of resolver 100 are shown in FIGS. 5a and 5b. As with the signals from the first resolver 10, the phases of the two output waveforms are 90 degrees offset from each other. Because the resolver 100 in FIG. 4 is a four-pole device, the output waveforms from each coil will produce two positive and two negative peaks for every 360 degrees of shaft rotation. As the first resolver 10 produces only one cycle per revolution, the amplitude and slope of its output signals define a unique angular position; whereas in the output of the second resolver 100 the same amplitude and slope occur twice per revolution.

Although the present invention has been described in terms a two phase resolver, the present invention may be incorporated in resolvers having various number of phases, if such is desired.

I claim:

1. A rotary transducer comprising:
   first and second ring-shaped magnetic pole elements spaced from each other along a common axis;
   first and second coils, each being wound through said first and second pole elements and spaced radially around the axis from each other;
   an excitation coil for producing an alternating magnetic field which polarizes said pole elements; and
   a rotor within said ring shaped pole elements having a shaft extending along the common axis, and having first and second magnetic coupling elements spaced along the shaft, each of the coupling elements associated with a different one of said pole elements and providing substantially 180 degrees of magnetic coupling with respect to the associated pole element.

2. The transducer as in claim 1 wherein each of the coupling elements has a substantially semi-circular shape, the coupling elements positioned substantially 180 degrees with respect to each other about the shaft; and wherein said first and second coils are spaced substantially 90 degrees from each other around the axis.

3. The transducer as in claim 1 wherein said excitation coil is wound axially between said first and second pole elements.

4. The transducer as in claim 1 wherein the first and second coupling elements are coplanar with the corresponding pole element.

5. The transducer as in claim 4 wherein each of the coupling elements has a substantially semi-circular shape in the plane of said pole element.

6. The transducer as in claim 1 wherein said first and second coils are spaced radially substantially 45 degrees from each other around the axis.

7. The transducer as in claim 6 wherein each of the coupling elements comprises:
   a first portion extending axially from the shaft for substantially 90 degrees around the shaft; and
   a second portion extending axially from the shaft opposite said first portion for substantially 90 degrees around the shaft.

8. The transducer as in claim 1 wherein said first and second coils are wound through said pole elements in a manner to produce signals from said coils which are modulated by signals having triangular waveforms.

9. A rotary transducer comprising:
   first and second ring-shaped magnetic pole elements spaced from each other along a common axis;
   an excitation coil for producing a magnetic field which polarizes said pole elements;
   a rotor, within said pole elements, having a shaft extending along the axis and having separate first and second magnetic coupling elements spaced along said shaft each of the coupling elements associated with one of said pole elements and providing substantially 180 degrees of magnetic coupling with respect to the associated pole element; and
   first and second output coils each positioned with respect to said first and second pole elements so that a current is induced in each output coil due to the magnetic coupling of said rotor to said pole elements, which current varies with respect to the angular position of the rotor within the pole elements.

10. The rotary position transducer as in claim 9 wherein said excitation coil is axially between said first and second pole elements.

11. The transducer as in claim 9 wherein each of said coupling elements has a substantially semi-circular shape.

12. The transducer as in claim 9 wherein each of the coupling elements comprises:
   a first portion extending axially from the shaft for substantially 90 degrees about the shaft; and
   a second portion extending axially from the shaft opposite said first portion for substantially 90 degrees about the shaft.

13. The transducer as in claim 9 wherein said output coils are positioned so as to produce signals that are modulated by signals having triangular waveforms.

14. The transducer as in claim 9 wherein said magnetic pole elements have apertures extending therethrough and said output coils being wound through the apertures in each pole element, the apertures in one of said pole elements being rotated about the axis with respect to the other pole element so that the apertures of the two pole elements are not aligned.

15. A rotary transducer comprising:

first and second ring-shaped magnetic pole elements spaced from each other along a common axis;

an excitation coil for producing a magnetic field which polarizes said pole elements;

a rotor, within said pole elements, having a shaft extending along the axis and having separate first and second magnetic coupling elements spaced along said shaft each of the coupling elements magnetically coupled to a different one of said pole elements; and first and second output coils each positioned with respect to said first and second pole elements so that a current is induced in each output coil due to the magnetic coupling of said rotor to said pole elements, which current varies with respect to the angular position of the rotor within the pole elements.

* * * * *